United States Patent
Xiang et al.

(10) Patent No.: US 10,016,727 B2
(45) Date of Patent: Jul. 10, 2018

(54) METHOD FOR EXTRACTING MAGNESIUM AND LITHIUM AND PRODUCING LAYERED DOUBLE HYDROXIDE FROM BRINE

(71) Applicant: Beijing University of Chemical Technology, Beijing (CN)

(72) Inventors: Xu Xiang, Beijing (CN); Ruirui Wang, Beijing (CN); Xue Duan, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 136 days.

(21) Appl. No.: 15/310,998

(22) PCT Filed: Nov. 13, 2015

(86) PCT No.: PCT/CN2015/094534
§ 371 (c)(1),
(2) Date: Nov. 14, 2016

(87) PCT Pub. No.: WO2016/184055
PCT Pub. Date: Nov. 24, 2016

(65) Prior Publication Data
US 2017/0189855 A1    Jul. 6, 2017

(30) Foreign Application Priority Data

May 18, 2015 (CN) .......................... 2015 1 0253366

(51) Int. Cl.
*B01D 61/44* (2006.01)
*B01D 61/58* (2006.01)
*C04B 22/06* (2006.01)
*C04B 26/26* (2006.01)

(52) U.S. Cl.
CPC ............. *B01D 61/44* (2013.01); *B01D 61/58* (2013.01); *C04B 22/06* (2013.01); *C04B 26/26* (2013.01)

(58) Field of Classification Search
None
See application file for complete search history.

(56) References Cited

U.S. PATENT DOCUMENTS

| 7,022,302 B2 | 4/2006 | Oza et al. |
| 7,084,085 B2 * | 8/2006 | O'Hare ................. C01F 7/0606 423/600 |

(Continued)

FOREIGN PATENT DOCUMENTS

| AU | 2004237790 | 6/2006 |
| CN | 1579937 | 2/2005 |

(Continued)

OTHER PUBLICATIONS (4) Hsieh et al., "Rapid direct growth of Li—Al layered double hydroxide (LDH) film on glass, silicon wafer and carbon cloth and characterization of LDH film on substrates", J. Mater. Chem., 2011, 21, 1880.*

(Continued)

*Primary Examiner* — Krishnan S Menon
(74) *Attorney, Agent, or Firm* — Hanley, Flight and Zimmerman, LLC (57) ABSTRACT

The present invention relates to a method for extracting magnesium and lithium and also producing layered double hydroxides (LDH) from brine, comprising the steps of: adding an aluminum salt to brine, to prepare a mixed salt solution A for preparing MgAl-LDH; adding an alkaline solution to carry out co-precipitation, followed by crystallization; after the crystallization is complete, performing solid-liquid separation to obtain a solid product of MgAl-LDH and a filtrate; concentrating the filtrate by evaporation to obtain a lithium-rich brine, adding an aluminum salt thereto to prepare a mixed salt solution B for preparing LiAl-LDH; adding the mixed salt solution B to an alkaline solution to carry out precipitation; after the precipitation is (Continued)

complete, performing solid-liquid separation to obtain a solid product of LiAl-LDH and a filtrate; and concentrating the filtrate by evaporation, returning the solution concentrated by evaporation to the lithium-rich brine for recycled use. This method uses mild reaction and simple equipment, has a small loss of Li, can achieve isolation of resources from salt lakes, and can also obtain functional materials having a high added value.

20 Claims, 3 Drawing Sheets

(56) References Cited

U.S. PATENT DOCUMENTS 9,315,420 B2 * 4/2016 Duan .................. C04B 26/26

2004/0126301 A1 * 7/2004 Oza .................. C01F 7/005
423/420.2
2011/0288219 A1 * 11/2011 Tsai .................. C08K 9/08
524/407
2015/0218009 A1 8/2015 Gandhi et al.

FOREIGN PATENT DOCUMENTS

CN 1644508 7/2005
WO 2014033760 3/2014

OTHER PUBLICATIONS

International Searching Authority, "International Search Report and Written Opinion", issued in connectio with PCT patent application No. PCT/CN2015/094534, dated Feb. 17, 2016, 8 pages. English translation of the written opinion not available.

* cited by examiner

METHOD FOR EXTRACTING MAGNESIUM AND LITHIUM AND PRODUCING LAYERED DOUBLE HYDROXIDE FROM BRINE

RELATED APPLICATIONS

This patent is a national stage application of International PCT Application No. PCT/CN2015/094534, filed on Nov. 13, 2015, and is hereby incorporated by reference in its entirety. Further, this patent claims priority to Chinese Patent Application 201510253366.4, which was filed on May 18, 2015, and is hereby incorporated by reference in its entirety.

TECHNICAL FIELD

The present invention relates to a method for extracting magnesium and lithium and also producing layered double hydroxides (LDH) from brine by a reaction-separation coupled technique.

BACKGROUND ART

Salt lakes generally refer to lakes having a salinity greater than 50 g·L$^{-1}$. China has a variety of salt lake resources, including carbonate-type salt lakes predominant in Inner Mongolia, sulfate-type salt lakes predominant in Xinjiang, sulfate-subtype and chloride-type salt lakes predominant in Qaidam Basin in Qinghai, and carbonate-type and sulfate-type salt lakes predominant in Tibet. Salt lakes are rich in many valuable resources, such as potassium, sodium, magnesium, lithium and boron, which are important materials for production of various industrial and agricultural products.

Direct exploitation of salt lakes mainly refer to direct extraction and preliminary processing of various natural resources, such as potassium, magnesium, lithium and sodium, into basic raw materials for chemical industries. In current exploitation of these resources, exploitation of potassium resources has been industrialized and provides an important source of potassium fertilizer and significant economic benefits in China. In brine, trace amount of lithium generally exists together with large amounts of alkali metal and alkali earth metal ions. Because they have similar chemical properties, extraction of lithium therefrom has been facing enormous difficulty, which is compounded by a high level of magnesium that limits lithium extraction from brine (FU Ye and ZHONG Hui, Current research status of separation of salt lake brine having high Mg/Li ratio by precipitation [J], *Kuangchan Zonghe Liyong*, 2010, 2: 30-32). The current separation process for lithium extraction involves isolation of sodium and potassium first, to leave a bittern having mixed Mg and Li, which are then further separated. By such a process it is very difficult to separate and extract magnesium and lithium because salt lakes having a high Mg/Li ratio are dominant in China. Current main methods for extracting lithium from brine include precipitation, solvent extraction, adsorption, calcination, carbonization, salting out, and the like (HUANG Hao, Studies in techniques for separating magnesium from lithium in acidified aged brine from the West Taijinar Lake in Qinghai [D], Chengdu University of Technology, 2009). Among these methods, ion-exchange adsorption can extract lithium at a yield of 90%, but has a strict requirement for a highly selective adsorbent. Current adsorbents are prepared by a complex method and have a low exchange rate, not suitable for large-scale operation and application. Furthermore, methods like adsorption have strict requirements for process conditions and equipment. Solvent extraction has strict requirements for process conditions, extraction equipment and extracting agents, has a low yield per extraction which is less than 50%, is performed in a complex procedure, causes severe corrosion to equipment, and has a high cost, thereby not applicable for scaled-up production. The salting-out method has serious problems of equipment corrosion and solid entrainment, produces some effects only in laboratories, and has not been well industrialized. The calcination method, although already industrialized, has problems of high energy consumption, incomplete calcination, severe corrosion of equipment, evaporating a large volume of water, and being unsuitable for brine having a high Mg/Li ratio (Jianyuan YANG and Kangming XIA, Process for producing high purity magnesate, lithium carbonate, hydrogen chloride and ammonium chloride [P], CN1724373, 2006). The lithium recovery rate by the calcination method is generally about 80%. Carbonization facilitates large-scale lithium extraction, and has advantages of continuous operation, a low cost, and good product quality, but its development is limited by the gas source of carbon dioxide produced by it (Baocai WANG Lithium-bearing brine resources status and its progress of development technology in China [J], IM&P, 2000, 10: 13-15). The selective semi-permeable membrane method mainly uses an ion-exchange membrane selective for mono-valent ions to cyclically concentrate lithium to obtain lithium-rich, magnesium-lean brine, followed by addition of soda to precipitate and obtain a lithium carbonate product, of which the lithium extraction yield per cycle can reach 80%. However, this method heavily depends on the membrane material, and such materials are proprietary to foreign companies. The precipitation method is a simple, low-cost extraction method, which is mainly suitable for extraction of lithium from salt lake brine having a low Mg/Li ratio. However, most salt lakes in China have a high Mg/Li ratio, and significant presence of magnesium salts will severely affect extraction of lithium and increase the difficulty of lithium extraction by this method, and eventually affect the salt lake lithium industries. Lithium resources extracted by this method are mainly in the form of lithium carbonate, lacking lithium-based functional material products having a high added value. All the methods described above can only extract lithium from brine, while the magnesium left behind by lithium extraction is not developed into a high-performance magnesium-based functional material. Therefore, the isolated magnesium resource is not fully used, and the utilization thereof is low.

Magnesium/aluminum layered double hydroxide (MgAl-LDH) and lithium/aluminum layered double hydroxide (LiAl-LDH) are double metal hydroxides having a layered structure, wherein metal atoms are alternately arranged in layers and anions may be inserted into the inter-layer regions, representing an important class of layered functional materials which find wide applications in the fields of catalysis, adsorption (adsorption of anions or carbon dioxides in solutions), functional aids (flame retardants, UV-blocking agents, and thermal stabilizers), and medicine (DUAN Xue, et al., (eds), Two-dimensional nano composite hydroxides: structure, assembly and function, *China Science Publishing & Media Ltd.* (Beijing), 2013).

SUMMARY OF INVENTION

In order to solve the above technical problems, the present invention aims to provide a method for extracting magnesium and lithium and also producing LDH from brine.

In order to achieve this objective, the present invention provides a method for extracting magnesium and lithium and also producing LDH from brine, comprising the steps of:

a) adding an aluminum salt to brine, to prepare a mixed salt solution A for preparing MgAl-LDH; adding an alkaline solution to carry out co-precipitation, followed by crystallization; after the crystallization is complete, performing solid-liquid separation to obtain a solid product of MgAl-LDH and a filtrate;

b) concentrating the filtrate by evaporation to obtain a lithium-rich brine, adding an aluminum salt thereto to prepare a mixed salt solution B for preparing LiAl-LDH; adding the mixed salt solution B to an alkaline solution to carry out precipitation; after the precipitation is complete, performing solid-liquid separation to obtain a solid product of LiAl-LDH and a filtrate; and c) concentrating the filtrate obtained in step b) by evaporation, returning the solution concentrated by evaporation to the lithium-rich brine in step b) for recycled use.

In the method for extracting magnesium and lithium and producing LDH from brine according to the present invention, preferably, the brine in step a) is brine from a sulfate-type salt lake which is rich in $Li^+$, $Mg^{2+}$, $K^+$ and $Na^+$, at concentrations of $[Li^+]=1$ to 3 g/L, $[Mg^{2+}]=10$ to 30 g/L, $[K^+]=5$ to 7 g/L, and $[Na^+]=70$ to 90 g/L.

In the method for extracting magnesium and lithium and producing LDH from brine according to the present invention, preferably, the brine in step a) is filtered to remove insoluble impurities prior to use.

In the method for extracting magnesium and lithium and producing LDH from brine according to the present invention, preferably, in the mixed salt solution A for preparing MgAl-LDH in step a), the total concentration of metal ions is 0.9 to 1.5 mol/L.

In the method for extracting magnesium and lithium and producing LDH from brine according to the present invention, preferably, in the mixed salt solution A for preparing MgAl-LDH in step a), the molar ratio of magnesium salt to aluminum salt is 2 to 4:1.

In the method for extracting magnesium and lithium and producing LDH from brine according to the present invention, preferably, the alkaline solution in step a) is a mixed solution of sodium hydroxide and sodium carbonate, having the same volume as the mixed salt solution A, wherein the number of moles of sodium hydroxide is 1.5 to 2.5 times the total number of moles of magnesium and aluminum, and the molar ratio of sodium carbonate to aluminum is 1.5 to 2.5:1.

In the method for extracting magnesium and lithium and producing LDH from brine according to the present invention, preferably, the co-precipitation in step a) is carried out by mixing the mixed salt solution A for preparing MgAl-LDH with the alkaline solution, and spinning them at 1000 to 5000 rpm for 1 to 10 min, to obtain crystal nuclei of MgAl-LDH.

In the method for extracting magnesium and lithium and producing LDH from brine according to the present invention, the operation of mixing the mixed salt solution A for preparing MgAl-LDH with the alkaline solution in step a) is a conventional operation in the art, the mixing process can be carried out in any reactor in the art suitable for mixing, but the mixing process needs to be performed under high-speed stirring. In a preferred embodiment of the present invention, the mixing process is performed in a colloid mill.

In the method for extracting magnesium and lithium and producing LDH from brine according to the present invention, preferably, the crystallization in step a) is carried out by allowing the crystal nuclei of MgAl-LDH obtained from the co-precipitation in step a) to react under stirring at 60 to 90° C. for 6 to 24 hours, and after the reaction is complete performing solid-liquid separation to obtain a filter cake of MgAl-LDH.

In the method for extracting magnesium and lithium and producing LDH from brine according to the present invention, preferably, when a filter cake of MgAl-LDH is obtained in step a), the filter cake is dried to obtain a solid product of MgAl-LDH, wherein the drying is performed at 60 to 80° C. for 6 to 12 hours.

In the method for extracting magnesium and lithium and producing LDH from brine according to the present invention, preferably, the solid product of MgAl-LDH obtained in step a) has a chemical formula of $[Mg^{2+}_{1-x}Al^{3+}_{x}(OH)_2](CO_3^{2-})_{x/2} \cdot nH_2O$, wherein x=0.2 to 0.4 and n=1 to 10.

In the method for extracting magnesium and lithium and producing LDH from brine according to the present invention, preferably, the lithium-rich brine in step b) has lithium ions at a concentration of 0.1 to 0.5 g/L.

In the method for extracting magnesium and lithium and producing LDH from brine according to the present invention, preferably, in the mixed salt solution B for preparing LiAl-LDH in step b), the molar ratio of lithium to aluminum is 1 to 6:1.

In the method for extracting magnesium and lithium and producing LDH from brine according to the present invention, preferably, the alkaline solution in step b) has a pH of 9 to 12, and includes an aqueous solution of sodium hydroxide or potassium hydroxide.

In the method for extracting magnesium and lithium and producing LDH from brine according to the present invention, preferably, the alkaline solution in step b) has the same volume as the mixed salt solution B for preparing LiAl-LDH, and the number of moles of sodium hydroxide or potassium hydroxide is 1 to 1.6 times the total number of moles of lithium and aluminum.

In the method for extracting magnesium and lithium and producing LDH from brine according to the present invention, preferably, the co-precipitation in step b) is carried out by dropwise adding the mixed salt solution B for preparing LiAl-LDH to the alkaline solution for co-precipitation, and after the co-precipitation is complete performing solid-liquid separation to obtain a filter cake of LiAl-LDH; wherein the speed of the dropwise adding is 1 to 5 ml/min; the pH for the co-precipitation is 9 to 12, the temperature for the co-precipitation is 10 to 25° C., and the duration of the co-precipitation is 8 to 24 hours.

In the method for extracting magnesium and lithium and producing LDH from brine according to the present invention, preferably, when a filter cake of LiAl-LDH is obtained in step b), the filter cake is dried to obtain a solid product of LiAl-LDH, wherein the drying is performed at 60 to 80° C. for 6 to 12 hours.

In the method for extracting magnesium and lithium and producing LDH from brine according to the present invention, preferably, the solid product of LiAl-LDH obtained in step b) has a chemical formula of $[LiAl_2(OH)_6]_2CO_3 \cdot nH_2O$, wherein n=1 to 10.

In the method for extracting magnesium and lithium and producing LDH from brine according to the present invention, preferably, the aluminum salt in step a) is one of aluminum nitrate, aluminum sulfate, and aluminum chloride.

In the method for extracting magnesium and lithium and producing LDH from brine according to the present invention, preferably, the aluminum salt in step b) is one of aluminum nitrate, aluminum sulfate, and aluminum chloride.

In the method for extracting magnesium and lithium and producing LDH from brine according to the present invention, preferably, the concentrating by evaporation in step c) is concentrating the filtrate obtained in step b) by evaporation to a lithium ion concentration of 0.1 to 0.5 g/L.

The present invention provides a method for extracting magnesium and lithium and producing LDH from brine, comprising the steps of:
A) adding an aluminum salt to brine, to prepare a mixed salt solution A for preparing MgAl-LDH; allowing the mixed salt solution A to undergo co-precipitation with an alkaline solution for co-precipitation, followed by crystallization after transferred to a reactor; after the crystallization is complete, performing solid-liquid separation to obtain a solid product of MgAl-LDH and a filtrate;
B) concentrating the filtrate by evaporation to obtain a lithium-rich brine, adding an aluminum salt thereto to prepare a mixed salt solution B for preparing LiAl-LDH; adding the mixed salt solution B to an alkaline solution of sodium hydroxide to allow precipitation; performing solid-liquid separation to obtain a solid product of LiAl-LDH and a filtrate; and
C) concentrating the filtrate obtained in step B) by evaporation, returning the concentrated solution to the lithium-rich brine for recycled use.

In the method for extracting magnesium and lithium and producing LDH from brine according to the present invention, preferably, the brine in step A) is brine from a sulfate-type salt lake which is rich in $Li^+$, $Mg^{2+}$, $K^+$ and $Na^+$, at concentrations of $[Li^+]=1$ to 3 g/L, $[Mg^{2+}]=10$ to 30 g/L, $[K^+]=5$ to 7 g/L, and $[Na^+]=70$ to 90 g/L; and the brine is filtered to remove insoluble impurities prior to use.

In the method for extracting magnesium and lithium and producing LDH from brine according to the present invention, preferably, in the mixed salt solution A for preparing MgAl-LDH in step A), the total concentration of metal ions is 0.9 to 1.5 mol/L, the molar ratio of magnesium salt to aluminum salt is 2 to 4:1; the alkaline solution is a mixed solution of sodium hydroxide and sodium carbonate, having the same volume as the mixed salt solution A, wherein the molar concentration of sodium hydroxide is 1.6 times the total molar concentration of magnesium and aluminum, and the molar concentration of sodium carbonate is two times the molar concentration of aluminum.

In the method for extracting magnesium and lithium and producing LDH from brine according to the present invention, preferably, the co-precipitation in step A) is carried out by adding the salt solution and the alkaline solution together to a colloid mill, and spinning them at 1000 to 5000 rpm for 1 to 10 min to form crystal nuclei of MgAl-LDH; transferring the crystal nuclei to a reactor to carry out reaction under stirring at 60 to 90° C. for 6 to 24 hours; performing filtration to obtain a filter cake of MgAl-LDH, which is dried at 60 to 80° C. for 6 to 12 hours to obtain a white solid product of MgAl-LDH, which has a chemical formula of $[Mg^{2+}_{1-x}Al^{3+}_x(OH)_2](CO_3^{2-})_{x/2} \cdot nH_2O$, wherein x=0.2 to 0.33 and n=1 to 10.

In the method for extracting magnesium and lithium and producing LDH from brine according to the present invention, preferably, the lithium-rich brine in step B) is obtained by concentrating the filtrate obtained in step A by evaporation to a lithium ions concentration of 0.1 to 0.5 g/L.

In the method for extracting magnesium and lithium and producing LDH from brine according to the present invention, preferably, in the mixed salt solution B for preparing LiAl-LDH in step B), the molar concentration of lithium is 1 to 6 times the molar concentration of aluminum; the sodium hydroxide solution has the same volume as the mixed salt solution B, and the molar concentration of sodium hydroxide is 1 to 1.6 times the total molar concentration of lithium and aluminum.

In the method for extracting magnesium and lithium and producing LDH from brine according to the present invention, preferably, the co-precipitation in step B) is carried out by dropwise adding the mixed salt solution B to the sodium hydroxide solution at a speed of 1 to 5 ml/min, maintaining the pH at 10.5 to 12, allowing the co-precipitation to proceed at 10 to 25° C. for 8 to 24 hours, performing filtration, and drying the filter cake at 60 to 80° C. for 6 to 12 hours, to obtain a solid product of LiAl-LDH, which has a chemical formula of $[LiAl_2(OH)_6]_2CO_3 \cdot nH_2O$, wherein n=1 to 10.

In the method for extracting magnesium and lithium and producing LDH from brine according to the present invention, preferably, the aluminum salt in steps A) and B) is one of aluminum nitrate, aluminum sulfate, and aluminum chloride.

In the method for extracting magnesium and lithium and producing LDH from brine according to the present invention, preferably, the procedure of concentrating the filtrate by evaporation in step C) is concentrating the filtrate by evaporation to a lithium concentration $[Li^+]$ of 0.1 to 0.5 g/L.

The present invention aims to provide a method for extracting Mg and Li elements from brine of salt lakes and also producing MgAl-LDH and LiAl-LDH by a reaction-separation coupled technique.

Figure 1:
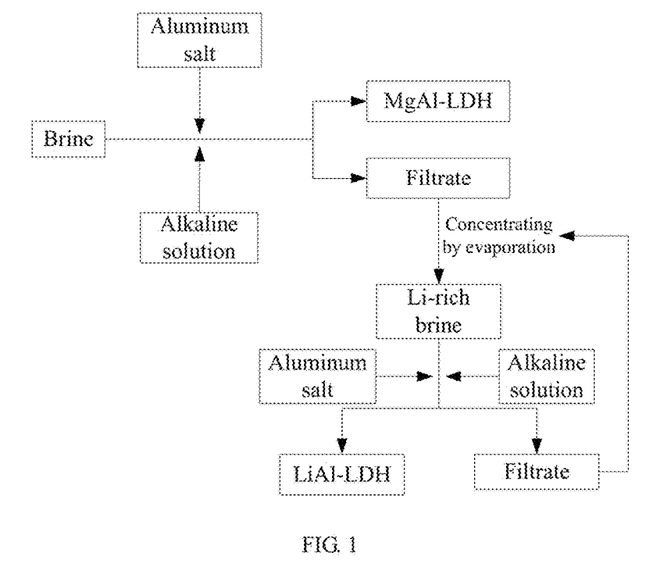
FIG. 1 is the process flow of a method for extracting Mg and Li elements from brine and also producing LDH according to the present invention.

FIG. 1 shows the process flow of a method for extracting Mg and Li elements from brine and also producing MgAl-LDH and LiAl-LDH by a reaction-separation coupled technique, the method comprising the steps of:
A) adding an aluminum salt to brine, to prepare a mixed salt solution A for preparing MgAl-LDH; allowing the mixed salt solution A to undergo co-precipitation with an alkaline solution for co-precipitation, followed by crystallization after transferred to a reactor; after the crystallization is complete, performing solid-liquid separation to obtain a solid product of MgAl-LDH and a filtrate;
B) concentrating the filtrate by evaporation to obtain a lithium-rich brine, adding an aluminum salt thereto to prepare a mixed salt solution B for preparing LiAl-LDH; adding the mixed salt solution B to an alkaline solution of sodium hydroxide to allow precipitation; performing solid-liquid separation to obtain a solid product of LiAl-LDH and a filtrate; and
C) concentrating the filtrate obtained in step B) by evaporation, returning the concentrated solution to the lithium-rich brine for recycled use.

The brine in step A) is brine from a sulfate-type salt lake which is rich in $Li^+$, $Mg^{2+}$, $K^+$ and $Na^+$, at concentrations of $[Li^+]=1$ to 3 g/L, $[Mg^{2+}]=10$ to 30 g/L, $[K^+]=5$ to 7 g/L, and $[Na^+]=70$ to 90 g/L; and the brine is filtered to remove insoluble impurities prior to use.

In the mixed salt solution A for preparing MgAl-LDH in step A), the total concentration of metal ions is 0.9 to 1.5 mol/L, and the molar ratio of magnesium salt to aluminum salt is 2 to 4:1;

the alkaline solution is a mixed solution of sodium hydroxide and sodium carbonate, having the same volume as the mixed salt solution A, wherein the molar concentration of sodium hydroxide is 1.6 times the total molar concentration of magnesium and aluminum, and the molar concentration of sodium carbonate is twice the molar concentration of aluminum.

The co-precipitation is carried out by adding the salt solution and the alkaline solution together to a colloid mill, and spinning them at 1000 to 5000 rpm for 1 to 10 min to form crystal nuclei of MgAl-LDH; transferring the crystal nuclei to a reactor to carry out reaction under stirring at 60 to 90° C. for 6 to 24 hours; performing filtration to obtain a filter cake of MgAl-LDH which is dried at 60 to 80° C. for 6 to 12 hours to obtain a white solid product of MgAl-LDH which has a chemical formula of $[Mg^{2+}_{1-x}Al^{3+}_x(OH)_2](CO_3^{2-})_{x/2} \cdot nH_2O$, wherein x=0.2 to 0.33 and n=1 to 10.

The lithium-rich brine in step B) is obtained by concentrating the filtrate obtained in step A) by evaporation to a lithium ion concentration of 0.1 to 0.5 g/L. In the mixed salt solution B, the molar concentration of lithium is 1 to 6 times the molar concentration of aluminum; the sodium hydroxide solution has the same volume as the mixed salt solution B, and the molar concentration of sodium hydroxide is 1 to 1.6 times the total molar concentration of lithium and aluminum.

The mixed salt solution B is added dropwise to the sodium hydroxide solution at a speed of 1 to 5 ml/min, while the pH is maintained at 10.5 to 12, the co-precipitation is allowed to proceed at 10 to 25° C. for 8 to 24 hours, followed by filtration, and the filter cake is dried at 60 to 80° C. for 6 to 12 hours, to obtain a solid product of LiAl-LDH, which has a chemical formula of $[LiAl_2(OH)_6]_2CO_3 \cdot nH_2O$, wherein n=1 to 10.

The aluminum salt in steps A) and B) is one of aluminum nitrate, aluminum sulfate, and aluminum chloride.

The procedure of concentrating the filtrate by evaporation in step C) is concentrating the filtrate by evaporation to a lithium concentration $[Li^+]$ of 0.1 to 0.5 g/L.

The present invention has the following advantageous effects:

(1) the present invention employs a reaction-separation coupled technique to extract magnesium and lithium resources from brine of salt lakes and also produce functional materials MgAl-LDH and LiAl-LDH; the method can not only achieve resource separation from salt lakes, but also obtain functional materials having a high added value; the method of the present invention pioneers an important approach to highly efficient exploitation of salt lake resources;

(2) in the method of the present invention, magnesium is first isolated from brine in the form of MgAl-LDH, resolving the difficulty of isolating Mg and Li from solutions having a high Mg/Li ratio in current conventional processes, and thereby significantly reducing the loss of Li; and (3) the present invention extracts Li in the form of LiAl-LDH; this method uses mild reaction and simple equipment, and has a small loss of Li; thus the method provided in the present invention is suitable for large-scale and efficient exploitation of lithium resources in brine of salt lakes.

DETAILED DESCRIPTION OF INVENTION

In order to provide a better understanding of the technical features, objectives and beneficial effects of the present invention, the embodiments of the present invention and the beneficial effects produced thereby will be described in detail below in conjunction with specific examples and figures, to help readers better understand the spirit and features of the present invention, but the scope of the present invention is not limited thereto.

The brine used in the example of the present invention was taken from the West Taijinar Salt Lake, and was sulfate-type brine, the composition of which is shown in Table 1 below. The process flow of the method for extracting Mg and Li from brine and also producing LDH as provided according to the present invention is shown in FIG. 1.

TABLE 1

| | Ion | | | | | |
|---|---|---|---|---|---|---|
| | $Na^+$ | $K^+$ | $Li^+$ | $Mg^{2+}$ | $Cl^-$ | $SO_4^{2-}$ |
| Concentration (g/L) | 70-90 | 5-7 | 1-3 | 10-30 | 140-160 | 20-40 |

Example 1

This Example provides a method for extracting Mg and Li from brine and also producing LDH, comprising the steps of:

a) 26.0325 g $MgCl_2 \cdot 6H_2O$, 25.7993 g $MgSO_4 \cdot 7H_2O$, 18.7290 g $AlCl_3 \cdot 6H_2O$, 3.3873 g KCl, 1.8768 g LiCl, and 8.068 g NaCl were weighed out and dissolved in deionized water, and the volume thereof was metered in a 250 ml volumetric flask to obtain a mixed salt solution A; 19.8593 g NaOH and 16.4443 g $NaCO_3$ were weighed out and dissolved in deionized water, and the volume thereof was metered in a 250 ml volumetric flask to obtain an alkaline solution;

the mixed salt solution A and the alkaline solution were added together to a colloid mill, and spun at 3000 rpm for 3 min to form crystal nuclei of MgAl-LDH; the crystal nuclei liquid was transferred to a reactor to carry out crystallization under dynamic stirring at 80° C. for 12 hours to grow MgAL-LDH; a filter cake of MgAl-LDH was obtained by filtration, and was dried at 70° C. for 12 hours to obtain a white solid product of MgAl-LDH, and the filtrate was collected in a container; the formula of the MgAl-LDH is $[Mg_{0.75}Al_{0.25}(OH)_2](CO_3^{2-})_{0.125} \cdot 5H_2O$;

b) the filtrate obtained in step a) was concentrated by evaporation at 50° C. to 250 ml wherein the lithium ion concentration reached 0.4432 g/L; 1.2847 g $AlCl_3 \cdot 6H_2O$ was added thereto to prepare a mixed salt solution B; 16.784 g NaOH was separately weighed and dissolved in 100 ml deionized water to a molar concentration of 4 mol/l; the mixed salt solution B was added dropwise to the sodium hydroxide solution at a speed of 1 ml/min, while the pH was maintained at 11, the co-precipitation was allowed to proceed at 20° C. for 12 hours, followed by filtration, and the filter cake was dried at 80° C. for 10 hours, to obtain a solid product of LiAl-LDH, which has a formula of [LiAl$_2$(OH)$_6$]$_2$CO$_3$.5H$_2$O; and c) the filtrate obtained in step b) was concentrated by evaporation to [Li$^+$]=0.3 g/L, and the concentrate was returned to step b) for recycled use.

Figure 2:
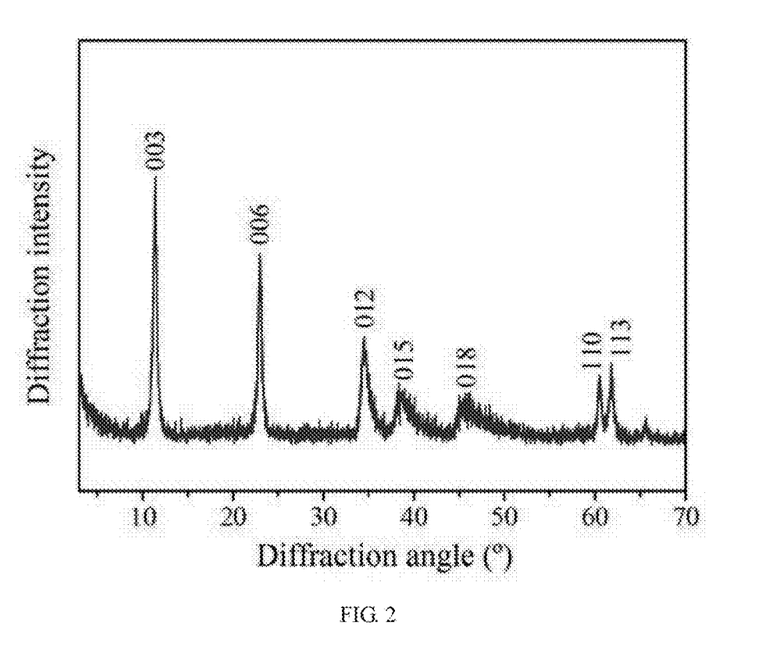
FIG. 2 is the X-ray diffraction spectrum of a MgAl-LDH product prepared according to Example 1 of the present invention.
Figure 3:
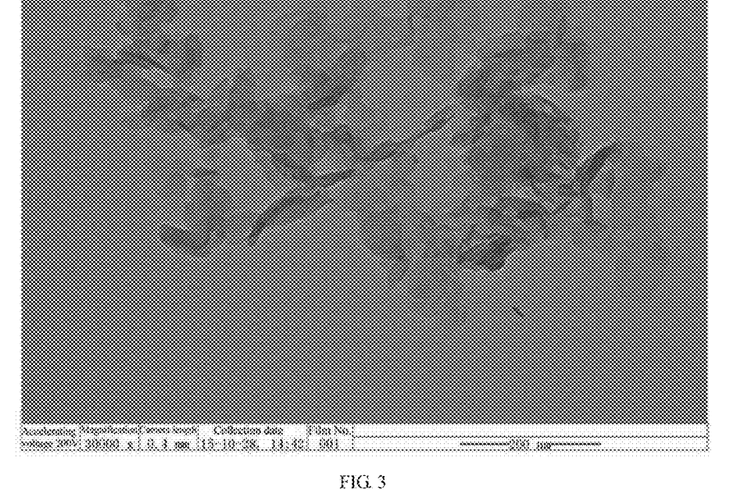
FIG. 3 is the transmission electron microscope (TEM) topograph of a MgAl-LDH product prepared according to Example 1 of the present invention.

The MgAl-LDH product prepared in Example 1 was analyzed by X-ray diffraction and transmission electron microscopy (TEM), to obtain an X-ray diffraction spectrum as shown in FIG. 2 and a TEM topograph as shown in FIG. 3, respectively.

Figure 4:
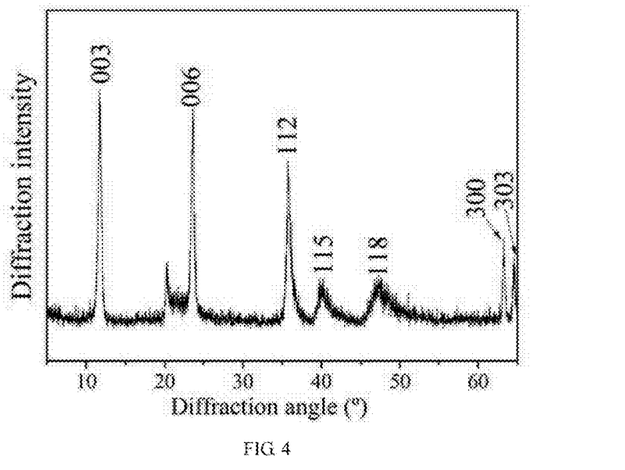
FIG. 4 is the X-ray diffraction spectrum of a LiAl-LDH product prepared according to Example 1 of the present invention.
Figure 5:
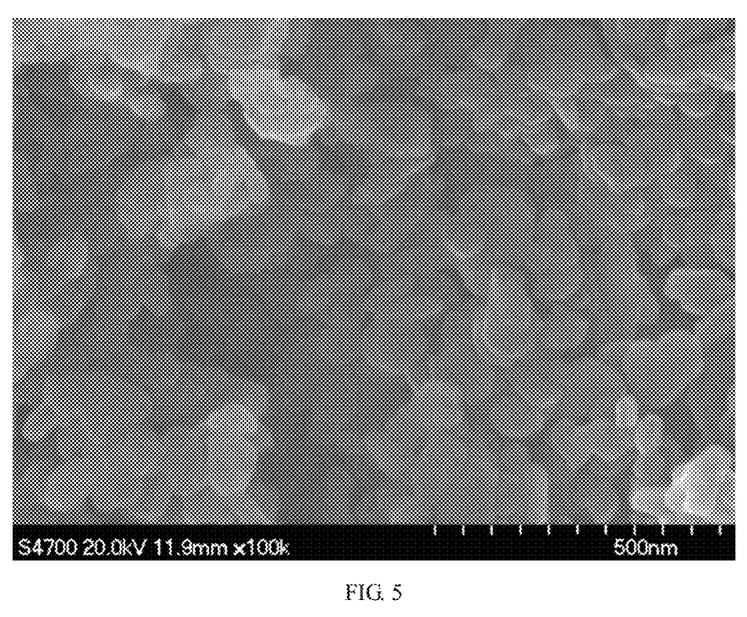
FIG. 5 is the scanning electron microscope (SEM) topograph of a LiAl-LDH product prepared according to Example 1 of the present invention.

The LiAl-LDH product prepared in Example 1 was analyzed by X-ray diffraction and scanning electron microscopy (SEM), to obtain an X-ray diffraction spectrum as shown in FIG. 4 and a SEM topograph as shown in FIG. 5, respectively.

Example 2 a) 39.0487 g MgCl$_2$.6H$_2$O, 38.6989 g MgSO$_4$.7H$_2$O, 32.7187 g Al(NO$_3$)$_3$.9H$_2$O, 9.1837 g KCl, 1.8768 g LiCl, and 8.068 g NaCl were weighed out and dissolved in deionized water, and the volume thereof was metered in a 250 ml volumetric flask to obtain a mixed salt solution A; 22.3368 g NaOH and 16.4443 g NaCO$_3$ were weighed out and dissolved in deionized water, and the volume thereof was metered in a 250 ml volumetric flask to obtain an alkaline solution;

the mixed salt solution A and the alkaline solution were added together to a colloid mill, and spun at 4000 rpm for 5 min to form crystal nuclei of MgAl-LDH; the crystal nuclei liquid was transferred to a reactor to carry out crystallization under dynamic stirring at 80° C. for 12 hours to grow MgAL-LDH; a filter cake of MgAl-LDH was obtained by filtration, and was dried at 80° C. for 6 hours to obtain a white solid product of MgAl-LDH, and the filtrate was collected in a container; the formula of the MgAl-LDH is [Mg$_{0.8}$Al$_{0.2}$(OH)$_2$](CO$_3^{2-}$)$_{0.1}$.6H$_2$O;

b) the filtrate obtained in step a) was concentrated by evaporation at 50° C. to 250 ml wherein the lithium ion concentration reached 0.4385 g/L; 1.9749 g Al(NO$_3$)$_3$.9H$_2$O was added thereto to prepare a mixed salt solution B; 16.784 g NaOH was separately weighed and dissolved in 100 ml deionized water to a molar concentration of 4 mol/l; the mixed salt solution B was added dropwise to the sodium hydroxide solution at a speed of 2 ml/min, while the pH was maintained at 11, the co-precipitation was allowed to proceed at 20° C. for 12 hours, followed by filtration, and the filter cake was dried at 70° C. for 12 hours, to obtain a solid product of LiAl-LDH, which has a formula of [LiAl$_2$(OH)$_6$]$_2$CO$_3$.3H$_2$O; and c) the filtrate obtained in step b) was concentrated by evaporation to [Li$^+$]=0.4 g/L, and the concentrate was returned to step b) for recycled use.

Example 3 a) 39.0487 g MgCl$_2$.6H$_2$O, 29.139 g MgSO$_4$.7H$_2$O, 71.2620 g Al$_2$(SO$_4$)$_3$.18H$_2$O, 9.1837 g KCl, 1.8768 g LiCl, and 8.068 g NaCl were weighed out and dissolved in deionized water, and the volume thereof was metered in a 250 ml volumetric flask to obtain a mixed salt solution A; 22.3223 g NaOH and 16.4443 g NaCO$_3$ were weighed out and dissolved in deionized water, and the volume thereof was metered in a 250 ml volumetric flask to obtain an alkaline solution;

the mixed salt solution A and the alkaline solution were added together to a colloid mill, and spun at 2000 rpm for 6 min to form crystal nuclei of MgAl-LDH; the crystal nuclei liquid was transferred to a reactor to carry out crystallization under dynamic stirring at 70° C. for 10 hours to grow MgAL-LDH; a filter cake of MgAl-LDH was obtained by filtration, and was dried at 80° C. for 8 hours to obtain a white solid product of MgAl-LDH, and the filtrate was collected in a container; the formula of the MgAl-LDH is [Mg$_{0.744}$Al$_{0.256}$(OH)$_2$](CO$_3^{2-}$)$_{0.128}$.4H$_2$O;

b) the filtrate obtained in step a) was concentrated by evaporation at 50° C. to 250 ml wherein the lithium ion concentration reached 0.4108 g/L; 1.6435 g Al$_2$(SO$_4$)$_3$.18H$_2$O was added thereto to prepare a mixed salt solution B; 16.784 g NaOH was separately weighed and dissolved in 100 ml deionized water to a molar concentration of 4 mol/l; the mixed salt solution B was added dropwise to the sodium hydroxide solution at a speed of 3 ml/min, while the pH was maintained at 10.5, the co-precipitation was allowed to proceed at 20° C. for 12 hours, followed by filtration, and the filter cake was dried at 70° C. for 12 hours, to obtain a solid product of LiAl-LDH, which has a formula of [LiAl$_2$(OH)$_6$]$_2$CO$_3$.6H$_2$O; and c) the filtrate obtained in step b) was concentrated by evaporation to [Li$^+$]=0.2 g/L, and the concentrate was returned to step b) for recycled use.

Example 4 a) 39.0487 g MgCl$_2$.6H$_2$O, 38.6989 g MgSO$_4$.7H$_2$O, 32.6363 g Al(NO$_3$)$_3$.9H$_2$O, 3.3873 g KCl, 1.8768 g LiCl, and 8.068 g NaCl were weighed out and dissolved in deionized water, and the volume thereof was metered in a 250 ml volumetric flask to obtain a mixed salt solution A; 33.472 g NaOH and 18.4422 g NaCO$_3$ were weighed out and dissolved in deionized water, and the volume thereof was metered in a 250 ml volumetric flask to obtain an alkaline solution;

the mixed salt solution A and the alkaline solution were added together to a colloid mill, and spun at 3000 rpm for 3 min to form crystal nuclei of MgAl-LDH; the crystal nuclei liquid was transferred to a reactor to carry out crystallization under dynamic stirring at 80° C. for 24 hours to grow MgAL-LDH; a filter cake of MgAl-LDH was obtained by filtration, and was dried at 70° C. for 10 hours to obtain a white solid product of MgAl-LDH, and filtrate was collected in a container; the formula of the MgAl-LDH is [Mg$_{0.8}$Al$_{0.2}$(OH)$_2$](CO$_3^{2-}$)$_{0.1}$.7H$_2$O;

b) the filtrate obtained in step a) was concentrated by evaporation at 50° C. to 250 ml wherein the lithium ion concentration reached 0.4573 g/L; 1.3256 g AlCl$_3$.6H$_2$O was added thereto to prepare a mixed salt solution B; 16.784 g NaOH was separately weighed and dissolved in 100 ml deionized water to a molar concentration of 4 mol/l; the mixed salt solution B was added dropwise to the sodium hydroxide solution at a speed of 5 ml/min, while the pH was maintained at 12, the co-precipitation was allowed to proceed at 20° C. for 12 hours, followed by filtration, and the filter cake was dried at 60° C. for 12 hours, to obtain a solid product of LiAl-LDH, which has a formula of [LiAl$_2$(OH)$_6$]$_2$CO$_3$.7H$_2$O; and c) the filtrate obtained in step b) was concentrated by evaporation to [Li$^+$]=0.4 g/L, and the concentrate was returned to step b) for recycled use.

The invention claimed is:

1. A method for extracting magnesium and lithium and also producing layered double hydroxides (LDH) from brine, characterized in that the method comprises the steps of:
    adding an aluminum salt to brine, to prepare a mixed salt solution A for preparing MgAl-LDH; adding an alkaline solution to carry out co-precipitation, followed by crystallization; after the crystallization is complete, performing solid-liquid separation to obtain a solid product of MgAl-LDH and a filtrate;
    concentrating the filtrate by evaporation to obtain a lithium-rich brine, adding an aluminum salt thereto to prepare a mixed salt solution B for preparing LiAl-LDH; adding the mixed salt solution B to an alkaline solution to carry out precipitation; after the precipitation is complete, performing solid-liquid separation to obtain a solid product of LiAl-LDH and a filtrate; and
    concentrating the filtrate obtained in step b) by evaporation, returning the solution concentrated by evaporation to the lithium-rich brine in step b) for recycled use.

2. The method for extracting magnesium and lithium and also producing LDH from brine according to claim 1, characterized in that the brine in step a) is brine from a sulfate-type salt lake which is rich in $Li^+$, $Mg^{2+}$, $K^+$ and $Na^+$, at concentrations of $[Li^+]$=1 to 3 g/L, $[Mg^{2+}]$=10 to 30 g/L, $[K^+]$=5 to 7 g/L, and $[Na^+]$=70 to 90 g/L.

3. The method for extracting magnesium and lithium and also producing LDH from brine according to claim 1, characterized in that the brine in step a) is filtered to remove insoluble impurities prior to use.

4. The method for extracting magnesium and lithium and also producing LDH from brine according to claim 1, characterized in that, in the mixed salt solution A for preparing MgAl-LDH in step a), the total concentration of metal ions is 0.9 to 1.5 mol/L.

5. The method for extracting magnesium and lithium and also producing LDH from brine according to claim 1, characterized in that, in the mixed salt solution A for preparing MgAl-LDH in step a), the molar ratio of magnesium salt to aluminum salt is 2 to 4:1.

6. The method for extracting magnesium and lithium and also producing LDH from brine according to claim 1, characterized in that the alkaline solution in step a) is a mixed solution of sodium hydroxide and sodium carbonate, having the same volume as the mixed salt solution A, wherein the number of moles of sodium hydroxide is 1.5 to 2.5 times the total number of moles of magnesium and aluminum elements, and the molar ratio of sodium carbonate to aluminum element is 1.5 to 2.5:1.

7. The method for extracting magnesium and lithium and also producing LDH from brine according to claim 1, characterized in that the co-precipitation in step a) is carried out by mixing the mixed salt solution A for preparing MgAl-LDH with the alkaline solution, and spinning them at 1000 to 5000 rpm for 1 to 10 min, to obtain crystal nuclei of MgAl-LDH.

8. The method for extracting magnesium and lithium and also producing LDH from brine according to claim 1, characterized in that the crystallization in step a) is carried out by allowing the crystal nuclei of MgAl-LDH obtained from the co-precipitation in step a) to react under stirring at 60 to 90° C. for 6 to 24 hours, and after the reaction is complete, performing solid-liquid separation to obtain a filter cake of MgAl-LDH.

9. The method for extracting magnesium and lithium and also producing LDH from brine according to claim 1, characterized in that, when a filter cake of MgAl-LDH is obtained in step a), the filter cake is dried to obtain a solid product of MgAl-LDH, wherein the drying is performed at 60 to 80° C. for 6 to 12 hours.

10. The method for extracting magnesium and lithium and also producing LDH from brine according to claim 1, characterized in that the solid product of MgAl-LDH obtained in step a) has a chemical formula of $[Mg^{2+}_{1-x}Al^{3+}_x(OH)_2](CO_3^{2-})_{x/2} \cdot nH_2O$, wherein x=0.2 to 0.4 and n=1 to 10.

11. The method for extracting magnesium and lithium and also producing LDH from brine according to claim 1, characterized in that the lithium-rich brine in step b) has lithium ions at a concentration of 0.1 to 0.5 g/L.

12. The method for extracting magnesium and lithium and also producing LDH from brine according to claim 1, characterized in that, in the mixed salt solution B for preparing LiAl-LDH in step b), the molar ratio of lithium to aluminum is 1 to 6:1.

13. The method for extracting magnesium and lithium and also producing LDH from brine according to claim 1, characterized in that the alkaline solution in step b) has a pH of 9 to 12, and includes an aqueous solution of sodium hydroxide or potassium hydroxide.

14. The method for extracting magnesium and lithium and also producing LDH from brine according to claim 1, characterized in that the alkaline solution in step b) has the same volume as the mixed salt solution B for preparing LiAl-LDH, and the number of moles of sodium hydroxide or potassium hydroxide is 1 to 1.6 times the total number of moles of lithium and aluminum elements.

15. The method for extracting magnesium and lithium and also producing LDH from brine according to claim 1, characterized in that the co-precipitation in step b) is carried out by
    dropwise adding the mixed salt solution B for preparing LiAl-LDH to the alkaline solution for co-precipitation, and after the co-precipitation is complete, performing solid-liquid separation to obtain a filter cake of LiAl-LDH; wherein the speed of the dropwise adding is 1 to 5 ml/min; the pH for the co-precipitation is 9 to 12, the temperature for the co-precipitation is 10 to 25° C., and the duration of the co-precipitation is 8 to 24 hours.

16. The method for extracting magnesium and lithium and also producing LDH from brine according to claim 1, characterized in that, when a filter cake of LiAl-LDH is obtained in step b), the filter cake is dried to obtain a solid product of LiAl-LDH, wherein the drying is performed at 60 to 80° C. for 6 to 12 hours.

17. The method for extracting magnesium and lithium and also producing LDH from brine according to claim 1, characterized in that the solid product of LiAl-LDH obtained in step b) has a chemical formula of $[LiAl_2(OH)_6]_2 CO_3 \cdot nH_2O$, wherein n=1 to 10.

18. The method for extracting magnesium and lithium and also producing LDH from brine according to claim 1, characterized in that the aluminum salt in step a) is one of aluminum nitrate, aluminum sulfate, and aluminum chloride.

19. The method for extracting magnesium and lithium and also producing LDH from brine according to claim 1, characterized in that the aluminum salt in step b) is one of aluminum nitrate, aluminum sulfate, and aluminum chloride.

20. The method for extracting magnesium and lithium and also producing LDH from brine according to claim 1, characterized in that the concentrating by evaporation in step c) is concentrating the filtrate obtained in step b) by evaporation to a lithium ion concentrating of 0.1 to 0.5 g/L.

* * * * *